(12) United States Patent
Feye-Hohmann

(10) Patent No.: US 8,209,852 B2
(45) Date of Patent: Jul. 3, 2012

(54) ARRANGEMENT FOR LOCKING THE SCREWS OF ELECTRIC TERMINALS

(75) Inventor: Juergen Feye-Hohmann, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 256 days.

(21) Appl. No.: 12/529,255

(22) PCT Filed: Nov. 20, 2008

(86) PCT No.: PCT/EP2008/009810
§ 371 (c)(1),
(2), (4) Date: Aug. 31, 2009

(87) PCT Pub. No.: WO2009/068216
PCT Pub. Date: Jun. 4, 2009

(65) Prior Publication Data
US 2010/0107406 A1   May 6, 2010

(30) Foreign Application Priority Data
Nov. 30, 2007   (DE) .......................... 10 2007 058 051

(51) Int. Cl.
*H01R 9/24* (2006.01)
*F16B 41/00* (2006.01)

(52) U.S. Cl. ........... 29/747; 411/512; 411/999; 439/709

(58) Field of Classification Search ............... 29/747; 411/107, 112, 512, 180, 999, 85, 968, 969; 439/709, 729; 470/6
See application file for complete search history.

(56) References Cited

U.S. PATENT DOCUMENTS

| | | | |
|---|---|---|---|
| 3,462,110 A | 8/1969 | Cheslock | |
| 4,478,478 A | 10/1984 | Durand et al. | |
| 4,640,524 A * | 2/1987 | Sedlmair | 280/611 |
| 5,536,124 A * | 7/1996 | Silva | 411/85 |
| 5,544,746 A * | 8/1996 | Dohi | 206/346 |

FOREIGN PATENT DOCUMENTS

| | | |
|---|---|---|
| CH | 511522 A | 8/1971 |
| DE | 1650939 A1 | 12/1970 |
| DE | 7821308 | 12/1979 |
| DE | 3028958 A1 | 2/1981 |
| DE | 8410539 | 5/1985 |
| DE | 9308096 U1 | 7/1993 |
| DE | 29621267 U1 | 4/1997 |
| DE | 29621269 U1 | 4/1997 |
| DE | 69520125 | 6/2001 |
| FR | 1173759 A | 3/1959 |
| FR | 2392516 A1 | 12/1978 |
| FR | 2563947 A1 | 11/1985 |
| GB | 1179036 A | 1/1970 |

* cited by examiner

*Primary Examiner* — Livius R Cazan
(74) *Attorney, Agent, or Firm* — Leydig, Voit & Mayer, Ltd.

(57) ABSTRACT

An arrangement for securing at least one screw of an electric terminal includes a deformable insulating housing element, and at least one shaft having a shaft wall extending vertically in the housing element. The shaft wall includes profiling in an area thereof. The shaft is configured to receive a screw having a screw-head so that the screw is countersunk. The profiling is elastically deformable and configured to deform during insertion of the screw and to elastically return towards an interior of the shaft so as to secure the screw. At least one of the shaft and the screw has a non-circular shape.

6 Claims, 4 Drawing Sheets

ARRANGEMENT FOR LOCKING THE SCREWS OF ELECTRIC TERMINALS

CROSS REFERENCE TO PRIOR APPLICATIONS

This application is a U.S. National Phase application under 35 U.S.C. §371 of International Application No. PCT/EP2008/009810, filed Nov. 20, 2008, and claims benefit to German Patent Application No. 10 2007 058 051.9, filed Nov. 30, 2007. The International Application was published in German on Jun. 4, 2009 as WO 2009/068216 under PCT Article 21(2).

FIELD

The present invention relates to an arrangement for locking the screws of electric terminals having a member or a housing-like element made of an insulating deformable material.

BACKGROUND

Locking arrangements for preventing screws from accidental loosening in a housing area are known. Thus, for instance, German patent DE 296 21 267 describes a device having a screw-type terminal whose screw head is covered, except for a screwdriver opening, by a covering housing, whereby this covering housing has ribs that are at a minute distance from each other, said distance being smaller than the diameter of the screw head. In this version of the state of the art, the projections of the ribs are removed by scraping as the screw head turns, so that these ribs are pushed aside by deformation. Thanks to the plastic materials, the ribs recover, so that the countersunk screw is locked in the housing area.

A type of anti-loosening lock for screws is described in G 93 08 096.4. This version—which is intended for shank screws that have a thread-free bolt section or a tapered area between the screw head and the bold thread, and that can be screwed into holes created in connecting parts—provides that the connecting part of the housing on the screw side has an integral ring of material that is pressed into the thread-free area or into the tapered area when the screw is inserted, so that the screw is locked against accidental loosening from the connecting part.

In another version, which is described in German patent DE 30 28 958, the arrangement relates to a screw lock for electric terminals, whereby the screw can be arranged so as to be countersunk into a shaft of a member or housing-like element. In this context, the vertical shaft has profiling that can be elastically deformed when the screw is inserted and when the head passes over it. After the profiling has been passed, it recovers to such an extent that it recovers over the screw head, thus completing the locking of the countersunk screw.

In these arrangements for locking the screws of electric terminals, it is considered to be a drawback that the screw locking elements that are supposed to prevent loss of the screw require very close coordination of the dimensions as well as adherence to very narrow manufacturing tolerances. The constrictions in the plastic housing are pushed aside or deformed during the insertion in such a way that loss of a screw cannot be ruled out.

SUMMARY

An aspect of the present invention is to provide a simple and efficient arrangement for locking screws that allows greater head tolerances.

In an embodiment, the present invention provides an arrangement for securing at least one screw of an electric terminal. The arrangement includes a deformable insulating housing element, and at least one shaft having a shaft wall extending vertically in the housing element. The shaft wall includes profiling in an area thereof. The shaft is configured to receive a screw having a screw-head so that the screw is countersunk. The profiling is elastically deformable and configured to deform during insertion of the screw and to elastically return towards an interior of the shaft so as to secure the screw. At least one of the shaft and the screw has a non-circular shape.

BRIEF DESCRIPTION OF THE DRAWINGS

An embodiment of the invention is depicted schematically in the drawings and will be explained in greater detail below. The following is shown.

DETAILED DESCRIPTION

Figure 1:
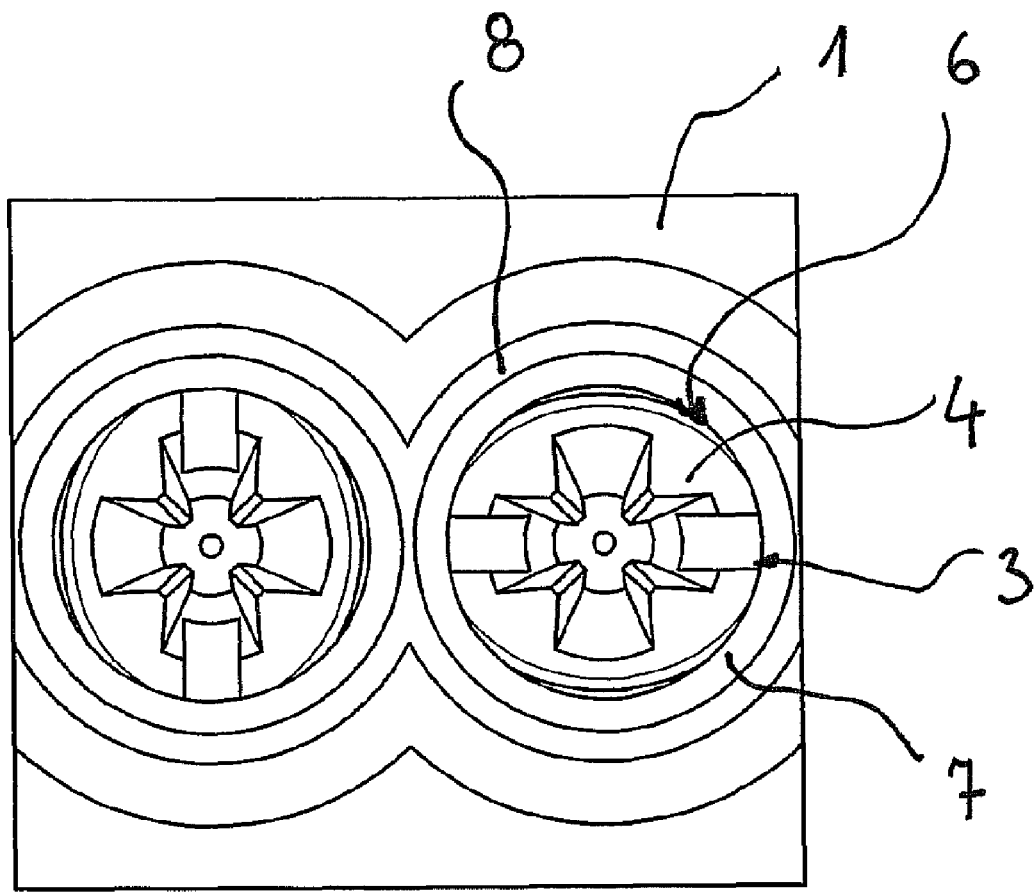
FIG. 1 shows a top view of an arrangement for locking screws, whereby two shafts are depicted in a top view with countersunk Phillips screws having an oval head according to an embodiment of the present invention.

The present invention allows the countersunk screw to have greater head tolerances and to be secured against accidental loosening. The constriction is created after or during the insertion of the screw in that excess material is first elastically displaced, whereby the material can advantageously escape into the integral grooves formed around the hole or into the free space, so that the edge of the constriction can move stress-free over the head of the screw. During the insertion, it is advantageous if the edge of the constriction is not stretched. It is only briefly deformed elastically, as a result of which there is no stress in the material and greater tolerances are possible. Preferably, the screw locking element is manufactured by means of injection molding, this entails the advantages that changes can be made in the mold and that the parts can be removed from the mold much more easily.

For this purpose, the shaft wall can be provided with a partially or completely encircling integral constriction that interacts with an encircling groove formed in the material, or else provided with a free space, whereby either the screw and/or the shaft can have a shape that is non-round. In this context, it is advantageous for the head of the screw to have an oval shape. By the same token, of course, it can also be provided that the shaft for receiving the screw can have an oval shape. In this embodiment, the shaft is largely free for the screw and is configured with a thin wall. Here, the dimension of the largest width is greater than the largest screw head. The cantilevered projection is considerably smaller than the smallest screw head. The circumference of the hole is larger than the head. During the insertion, the circumference stretches in that the area with the projection is pushed outwards. The area without the projection is pulled towards the screw.

Since the hole circumference is larger than the circumference of the screw head, the edge of the hole does not have to be stretched. The insertion is simple and screw tolerances are less problematic.

The same principle can also be implemented with a round hole and with a non-round, oval screw.

Here, too, the largest head circumference of the screw is preferably smaller than the circumference of the hole. During the insertion, the hole wall stretches and adapts to the non-round shape of the screw head without being stretched.

The insertion of the screw is promoted by the fact that the integral constriction is configured to be ring-shaped and its cross section shape is trapezoidal in this case. Therefore, when the screw head is countersunk into the shaft, the screw head with its non-round shape comes into contact with the slanted upper flank, and this especially promotes the deflection of the ring-shaped constriction in the area of the groove, whereby, as the screw head is tightened further, the screw head itself passes over the cross section shape—here the trapezoidal shape—with the result that recovery is caused by the lower slanted flank.

According to an embodiment of the present invention, the encircling groove or free space is rectangular in shape, whereby the bottom of the groove here is underneath the shoulder of the lower slanted flank of the integral constriction.

Figure 2:
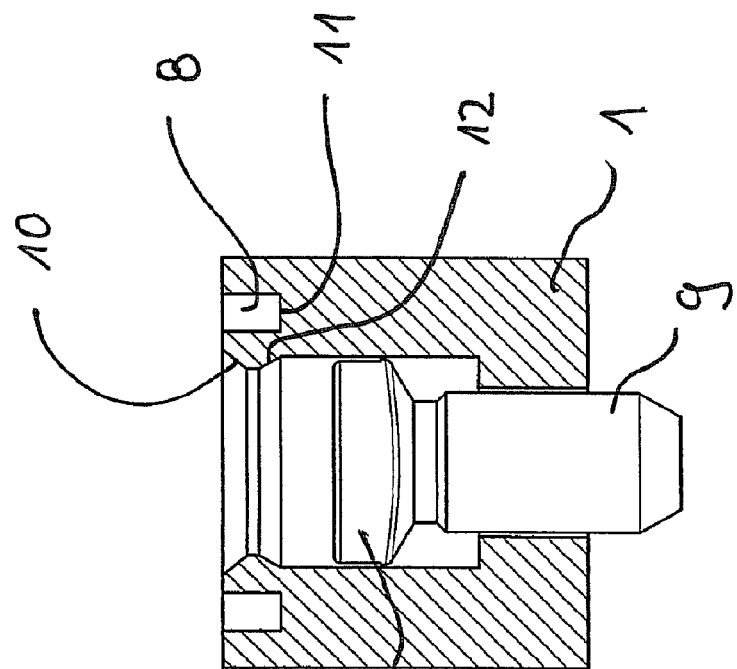
FIG. 2 shows a cutaway side view and perspective view according to FIG. 1 of a countersunk screw having an oval head, in a shaft.
Figure 2:
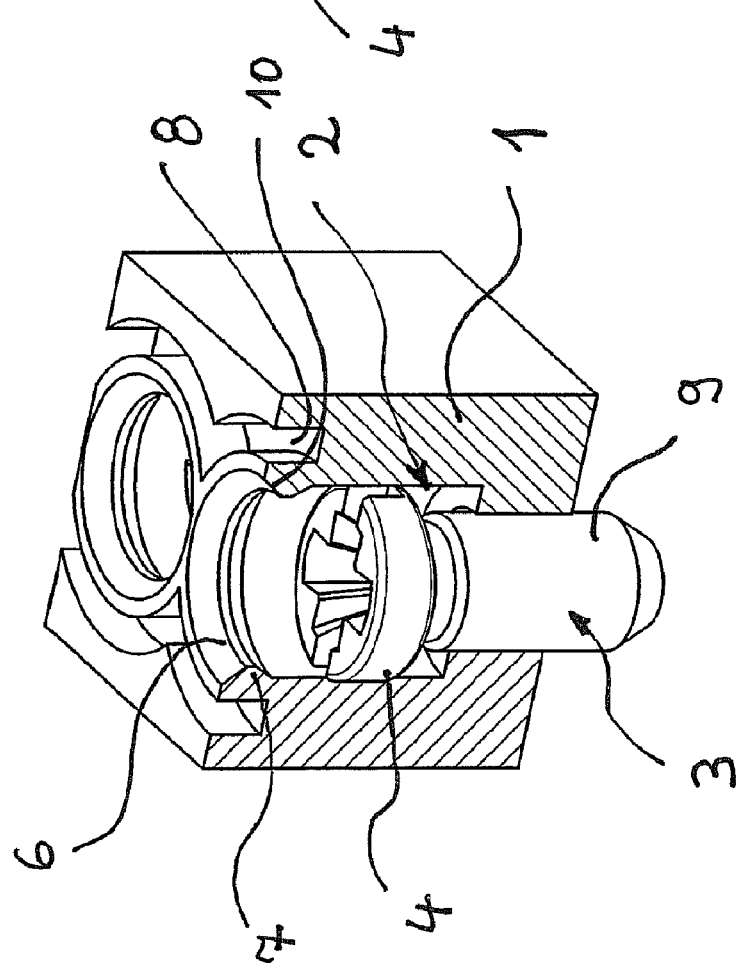
Figure 3:
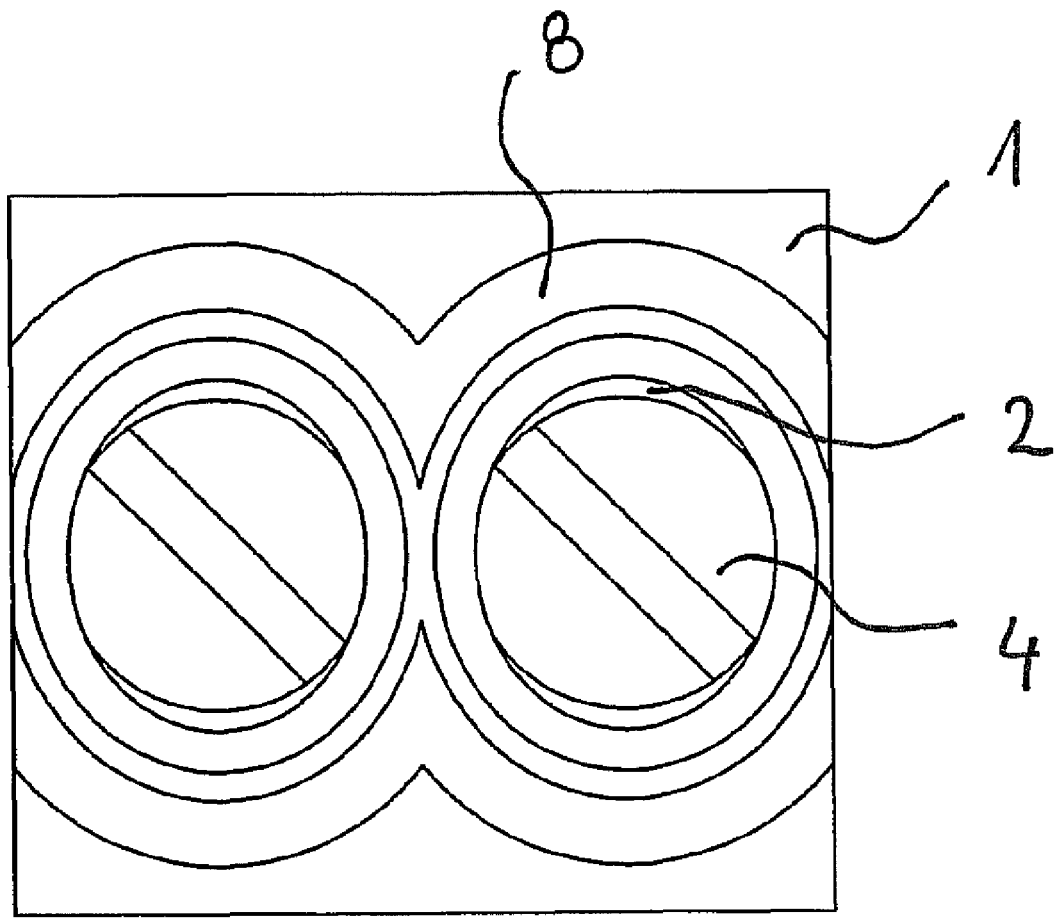
FIG. 3 shows an embodiment of the present invention, whereby here, two shafts having an oval shape and countersunk Phillips screws are shown in a top view.
Figure 4:
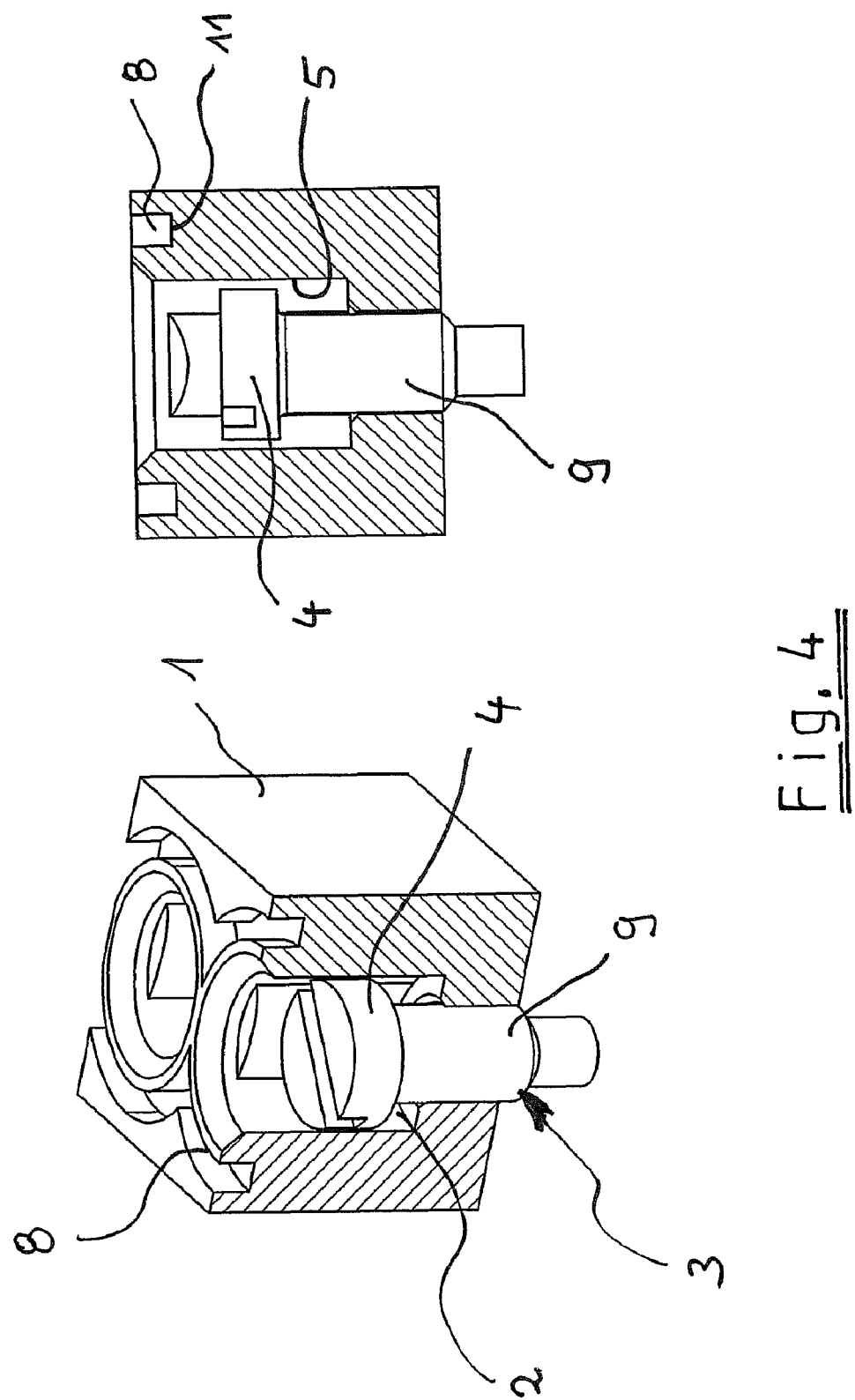
FIG. 4 shows a cutaway side view and perspective view according to FIG. 3 of a countersunk slotted head screw, in an oval-shaped shaft.

FIGS. 1 to 4 each show arrangements for locking screws of electric terminals. In this context, the arrangement includes a member or a housing-like element 1 made of an insulating deformable material such as, for example, a plastic material. A shaft 2, which runs essentially perpendicular, is formed in the member or a housing-like element 1, and a screw 3, including its head 4, can be countersunk into said shaft 2, as can be seen in FIGS. 2 and 4. In order to ensure that the screw cannot be accidentally loosened or lost, according to an embodiment of the present invention as shown in FIGS. 1 and 2, profiling 6 is provided in the area of the shaft wall 5. In this context, the profiling 6 is configured in such a way that it can be elastically deformed when the screw head 4 passes over it, that is to say, while the screw is being screwed in. In other words, when the screw head 4 is countersunk in the shaft 2, the profiling 6 is pushed back and it then recovers towards the interior of the shaft once the screw head 4 has passed through.

According to an embodiment of the present invention, it is provided that the shaft wall 5 interacts with an encircling groove 8 formed in the material, whereby the screw 3 or the shaft 2 can have a non-round shape. Instead of a groove, there can also be an open space or a free space. For this purpose, a constriction 7, as shown in the an embodiment of the present invention as shown in FIGS. 1 and 2, is shaped onto the inner wall of the shaft at the opening edge of the shaft 2. Here, the screw head 4 can have an oval shape, as is shown in FIGS. 1 and 2, whereby, according to another embodiment of the present invention, which is shown in FIGS. 3 and 4, the shaft 2 for receiving the screw 3 has an oval shape, whereby, this oval shape is imparted by the injection molding technique employed.

By viewing FIGS. 1 and 2 together, one can see that the integral constriction 7 is configured to be ring-shaped in such a way that its cross section shape is trapezoidal. Once the screw head 4 with its attached shank 9 is countersunk, the lower edge of the screw head 4 first reaches the upper slanted surface 10 of the constriction 7 and, as the screw is tightened further, the slanted position causes the constriction 7 to be pushed aside towards the groove 8 in the area where the material is weakened, whereby the constriction 7 then recovers into the interior of the shaft after the screw head 4 has passed completely through. This results in a constriction 7 that, in a manner of speaking, is spring-mounted due to the integral groove 8 that causes a weakening of the material, especially in the area of the encircling constriction 7, and this weakening promotes this springy deformation of the constriction 7.

Therefore, according to an embodiment of the present invention, the encircling constriction 7 in the housing shown in FIGS. 1 and 2, when an oval screw 3 is used, an elastic deformation of the shaft 2 occurs, whereby the encircling groove 8 and the resultant reduced wall thickness promote the deformation in a springy manner. The screw 3 is held by the housing overhang. Pairing the round shape with an oval screw head 4 allows the screws and the shaft to have similar circumferences. During the insertion, the round circumferential surface of the screw hole is deformed and briefly acquires an oval-like shape. The material deforms largely in the elastic range of the plastic and only to a slight extent in the plastic range. The constriction remains largely intact during the insertion and when the part is removed from the injection mold.

According to another embodiment of the present invention, depicted in FIGS. 3 and 4, the shaft 2 is configured to be oval. As a result, the screw lock is created by two opposite surfaces. The elastic deformation of the shaft 2 is brought about by the encircling groove 8 and by the resulting reduced wall thickness. The screw 3 is held by the housing overhang.

Pairing the oval shape with the circular screw head 4 allows the screw and the shaft to likewise have similar circumferences. During the insertion, the surfaces in the shaft 2 are deformed and they briefly acquire a circular shape. The material deforms largely in the elastic range of the plastic and only to a slight extent in the plastic range. The constriction 7 remains largely intact during the insertion and when the part is removed from the injection mold.

As already mentioned, the encircling groove 8 has a rectangular shape, whereby the bottom 11 of the groove 8 here is underneath the shoulder of the lower slanted flank 12 of the integral constriction 7. Consequently, this creates the adequate free space behind the constriction 7, which promotes the elastic, plastic deformation of the constriction 7 or of the shaft wall when the screw head 4 passes over it.

The present invention is not limited to the embodiments described herein; reference should be had to the appended claims.

The invention claimed is:

1. An arrangement for securing at least one screw of an electric terminal, comprising:
 a deformable insulating housing element including a plastic material and having:
  at least one shaft having a shaft wall extending vertically in the housing element, the shaft wall including profiling in an area thereof, the at least one shaft being configured to receive a screw having a screw head so that the screw is countersunk, the profiling being elastically deformable and configured to deform during insertion of the screw and to elastically return towards an interior of the shaft so as to secure the screw, and the at least one shaft being oval shaped, and
  a groove formed in the housing element encircling the shaft wall.

2. The arrangement as recited in claim 1, wherein the shaft wall includes an at least partially encircling integral constriction configured to interact with the encircling groove.

3. The arrangement as recited in claim 2, wherein the integral constriction is ring-shaped and includes a trapezoidal cross-section.

4. The arrangement as recited in claim 2, wherein the encircling groove is rectangular and includes a bottom portion disposed in an area of a shoulder of the integral constriction.

5. The arrangement as recited in claim 2, wherein the encircling groove is rectangular and includes a bottom portion disposed below a shoulder of the integral constriction.

6. The arrangement as recited in claim 1, wherein the profiling is configured to deform during insertion of the screw head.

\* \* \* \* \*